(12) United States Patent
Knight

(10) Patent No.: US 7,613,645 B2
(45) Date of Patent: Nov. 3, 2009

(54) ELECTRONIC INTERFACE CONFIGURED FOR DISPLAYING AND IDENTIFYING MIXED TYPES OF INFORMATION

(76) Inventor: Timothy Knight, 1171 Fife Ave., Palo Alto, CA (US) 94301

( * ) Notice: Subject to any disclaimer, the term of this patent is extended or adjusted under 35 U.S.C. 154(b) by 833 days.

(21) Appl. No.: 10/271,020

(22) Filed: Oct. 15, 2002

(65) Prior Publication Data

US 2006/0004584 A1    Jan. 5, 2006

(51) Int. Cl.
*G06F 17/60* (2006.01)
(52) U.S. Cl. .............................. 705/36; 705/37; 705/35
(58) Field of Classification Search .............. 705/35–37
See application file for complete search history.

(56) References Cited

U.S. PATENT DOCUMENTS

| 6,510,419 | B1 * | 1/2003 | Gatto ........................ 705/36 R |
| 6,643,124 | B1 * | 11/2003 | Wilk .......................... 361/681 |
| 6,727,930 | B2 * | 4/2004 | Currans et al. ............... 345/864 |
| 2002/0109680 | A1 | 8/2002 | Orbanes et al. |
| 2002/0138606 | A1 | 9/2002 | Robison |

OTHER PUBLICATIONS

Hollywood Stock Exchange (www.hsx.com).*
Carey, T.W., "The Electronic Investor: Analyze This", Barron's, vol. 82, No. 33 (Aug. 19, 2002).*
Bjork, et al. "WEST: A Web Browser for Small Terminals" Symposium on User Inerface software and Technology; 1999, pp. 187-196.*

* cited by examiner

*Primary Examiner*—Daniel S Felten
(74) *Attorney, Agent, or Firm*—Fitch, Even, Tabin & Flannery

(57) ABSTRACT

An improved interface and display method is disclosed for clearly delineating a characteristic of a data item through a visual indicator. In the case of stock quotes, price and volume information available online may be real-time, delayed, opening, closing or after-hours. To identify such time distinctions, different color/symbol visual indicators are used, such as, for example, different colored traffic lights corresponding to the various types of data. The invention is particularly useful for complying with various trading exchange regulations in small form factor display applications, as such regulations can vary from exchange to exchange, and at the same time require clear delineation to an end user as to the type of information being viewed.

22 Claims, 2 Drawing Sheets

ELECTRONIC INTERFACE CONFIGURED FOR DISPLAYING AND IDENTIFYING MIXED TYPES OF INFORMATION

FIELD OF THE INVENTION

The present invention relates to electronic interfaces and methods of presenting mixed types of information within the same. The invention has particular applicability to environments in which it is desirable to quickly identify different types of information quickly—as in the case of stock quotes, for example, where it is beneficial to distinctly designate and differentiate between real-time stock quotes, delayed stock quotes, end of day closing quotes, after hour quotes, etc.

BACKGROUND

Stocks, options, commodities, etc., are now extensively monitored (and even traded) by a large percentage of the public. It is commonplace, for example, for the average stock watcher to check the latest price quote for his/her favorite stock(s) "online" so to speak, either through dial-up, always-on, wireless, or some other network connection. Accordingly, a variety of computing platforms are now used to access the Internet to monitor securities trading, including desk tops, lap tops, personal digital appliances (PDAs), cell phones, and the like.

At this time, typical service providers on the World Wide Web (WWW) permit their subscribers to see a form of stock quotes known as "delayed" quotes. The "delay" is usually on the order of 10 to 30 minutes, and varies from exchange to exchange. Thus, for example, on most sites, to see quotes for stocks trading on the NASDAQ trading system, one must usually put up with a 15-minute delay. When such quotes are delayed, they are subject to various rules and regulations from the exchanges and the Securities and Exchange Commission for how they can be displayed. Alternatively, one can subscribe in some instances to the various exchanges, and get the benefit of so-called "real-time" quotes. Real-time quotes are preferable to delayed quotes for obvious reasons, but it is not possible for consumers to secure such quotes in all instances from all exchanges.

Accordingly, in some instances, it is possible for a website visitor to have access to some real-time quotes and some delayed quotes. When such visitor checks his/her portfolio (a collection of stocks or other securities set up by the visitor) they cannot easily tell at a glance which of their stocks is being displayed on a real-time basis, and which are being displayed on a delayed basis. This is undesirable because users want to know right away whether what they are seeing is current or not. Also, it would be useful to be able to quickly identify whether the price for an item being displayed is an opening price, a closing price, or an after-hours trading price.

It is apparent that the present inability to quickly differentiate the types of stock quotes being presented is undesirable, and that a solution is needed to this long-standing problem.

SUMMARY OF THE INVENTION

An object of the present invention, therefore, is to overcome the aforementioned limitations of the prior art.

Another object is to implement an electronic interface, which allows a WWW user to quickly and easily identify through a visual indicator what classification is associated with a particular item being displayed on a WWW page;

A related object is to implement an electronic interface which visually identifies whether trading information for a particular stock (or other security) is in fact delayed or real-time, or even opening/closing information, or after-hours information;

A further related object is to implement such interface in a manner that is simple, flexible and adaptable for a wide variety of computing platforms, so that users of such platforms can enjoy a common experience and benefit from such interface;

Yet another related object is to implement such interface in a manner that reduces the need for additional text, symbols or descriptors that may clutter and distract users from easily understanding the nature of information being presented to them;

A further object is to implement an electronic interface which visually identifies trading information in a manner that satisfies various exchange regulations calling for appropriate and clear labeling for different types of quotes.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions.

A first aspect of the invention, therefore, pertains to an interface for enabling a user of an electronic device to visibly identify a time-based characteristic of an item being displayed within a display of the electronic device. The interface comprises a display area identifying a plurality of items being monitored by the user, wherein each of the items can include either a first time characteristic or a second time characteristic; the display area being configured so that first identification information for a first item appears in a first portion of the display area and second identification information for a second item appears in a second portion of the display area; the display area further including a first visual indicator associated with the first portion for visually indicating the first time-based characteristic, and a second visual indicator associated with the second portion of the display area for visually indicating the second time-based characteristic. The visual indicators are selected so that the second visual indicator is sufficiently visually different from the first visual indicator so as to communicate to the user that the first item and the second item have different time-based characteristics.

In a preferred approach, the visual indicator is a colored traffic light symbol located in a third portion of the display area separate from the first portion and the second portion (such as an additional column). Of course, the visual indicator can be any single symbol or set of symbols that act as a short hand descriptor for the first time-based characteristic and the second time-based characteristic.

In other embodiments, the first visual indicator is incorporated as part of the first portion, and the second visual indicator is incorporated as part of the second portion, such as by the color used in a display for a foreground or background field. In yet additional embodiments, the first visual indicator and the second visual indicator are generated by a first flashing display area and a second flashing display area respectively, such that different flash rates are used for the first visual indicator and the second visual indicator.

The interface is particularly useful for small electronic devices such as a cell-phone, a personal digital assistant (PDA), or other hand-held device configured with an Internet browser that is adapted for interacting with reduced capacity World Wide Web pages, including those compatible with a Wide Area Protocol (WAP), or have been configured in some other fashion for small displays. In some applications, the interface may be self-configuring, so that it automatically sorts any items having such first time characteristic in a separate display region from items having the second time characteristic. The time-based indicator can be associated with one or more of the following: a trading instrument, an auction item, an online availability of an Internet user, and/or a sporting event item.

Another aspect of the invention pertains to an interface enabling a user viewing a World Wide Web (WWW) page to identify a time-based characteristic of securities trading information. In such application, the interface comprises a first display area containing a plurality of separate data fields associated with a tradable security. The separate data fields include: (a) at least one identification field for identifying a company and/or a trading symbol associated with the tradable security; (b) at least one trading information field for specifying one or more of a price, a trading volume, a price change, and/or a percentage change in the tradable security; and (c) a visual indicator for visually indicating a time-based characteristic of the tradable security, the visual indicator having at least a first appearance when the trading information is real-time. Accordingly, both real-time and delayed trading information for different tradable securities can be displayed at the same time within a single display area, or a single window.

In a preferred embodiment, the interface is configured to satisfy a Securities and Exchange Commission display requirement for identifying whether trading information is real-time or delayed, through use of the aforementioned indicator.

In lieu or in addition to a time-based characteristic, the visual indicator can further specify an origin of a quote associated with the tradable security, including a dealer or market maker. In addition, an additional visual indicator further specifies a type of quote associated with the tradable security, including whether the quote is a firm quote, a subject quote, or a workout quote.

A related aspect of the invention pertains to a method of displaying a time-based characteristic of securities trading information on a World Wide Web (WWW) page for a tradable security. The method generally comprises the steps of: (a) displaying at least one identification field identifying a company and/or a trading symbol for the tradable security; (b) displaying trading information for the tradable security, including a price, a trading volume, a price change, and/or a percentage change; and (c) displaying a visual indicator indicating a time-based characteristic of the tradable security, the visual indicator having a first visible appearance when the trading information is real-time.

In a preferred method, an additional step of: displaying a legend for interpreting the visual indicator is included to comply with various display requirements, such as exchange regulations. Furthermore, a web site provider may configure separate web pages for separate types of browsers, so that a first type of visual indicator is used for a first type of browser, and a second type of visual indicator for a second type of browser.

DETAILED DESCRIPTION

Figure 1:
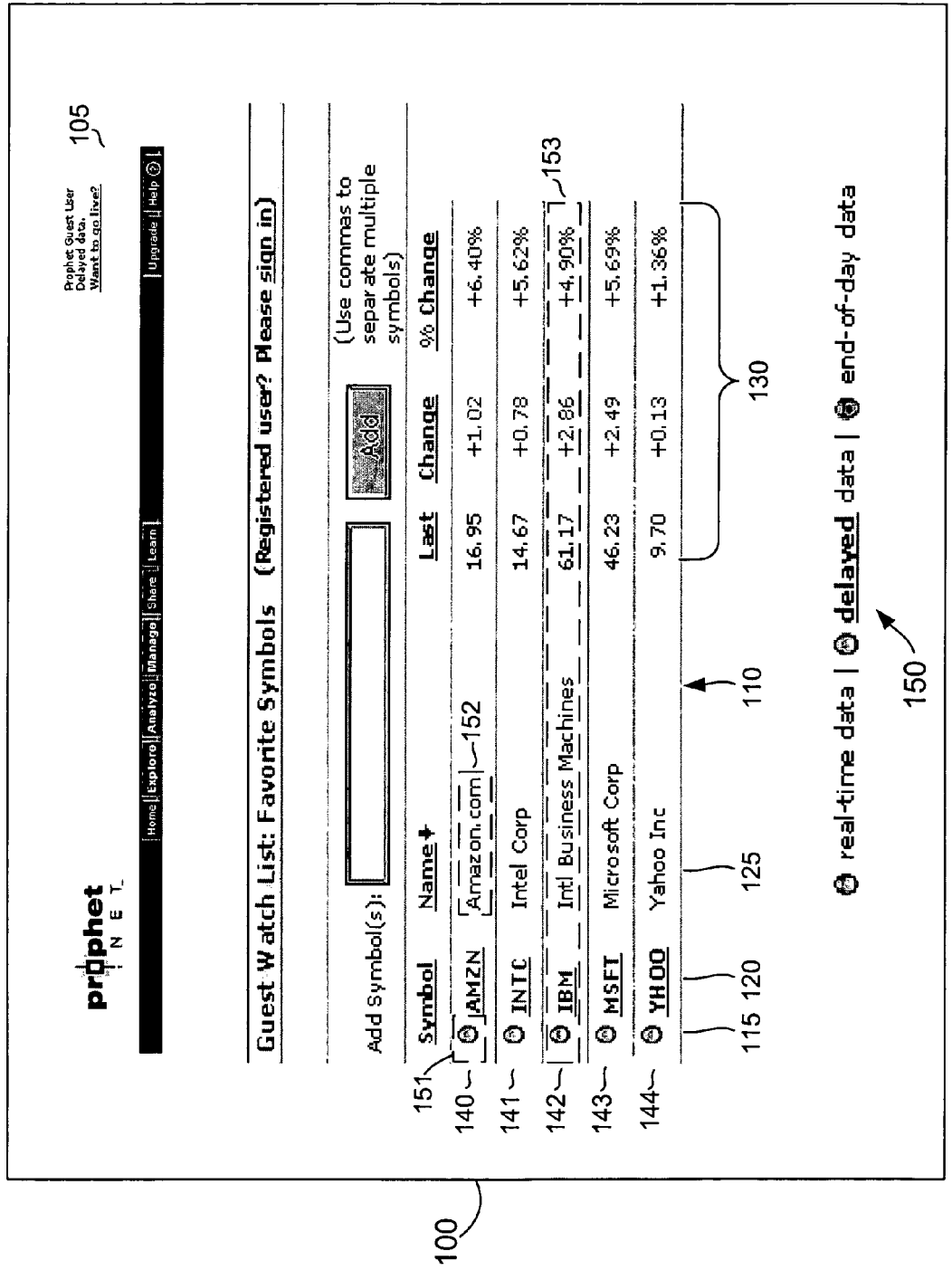
FIG. 1 is an illustration of a preferred embodiment of an electronic interface embodying the present invention.
Figure 2:
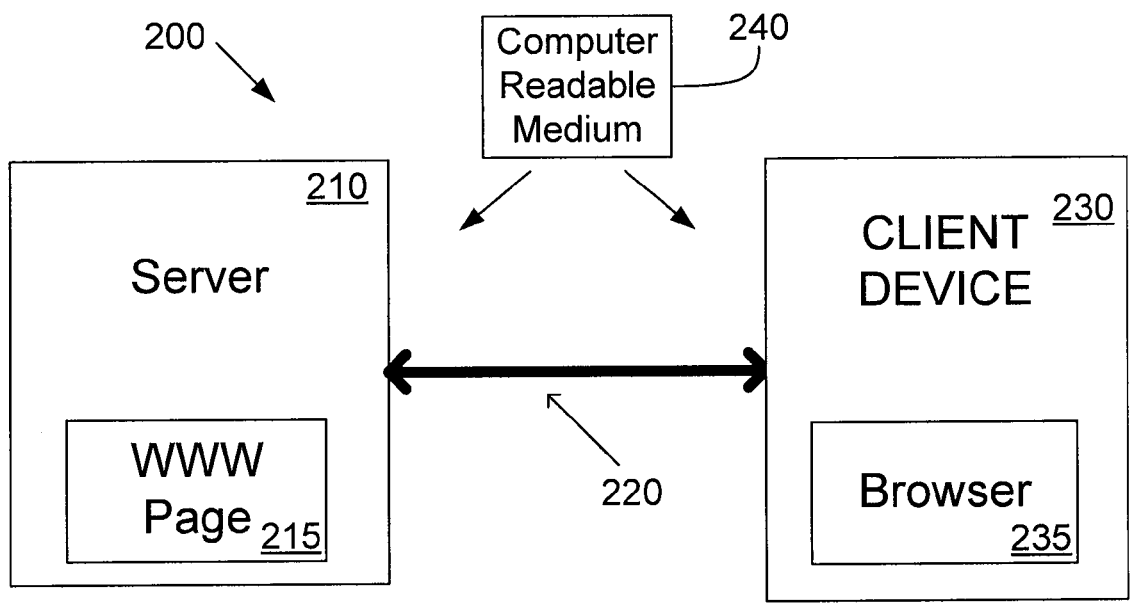
FIG. 2 shows a block diagram of an apparatus in accordance with various embodiments as described herein.
Figure 2:
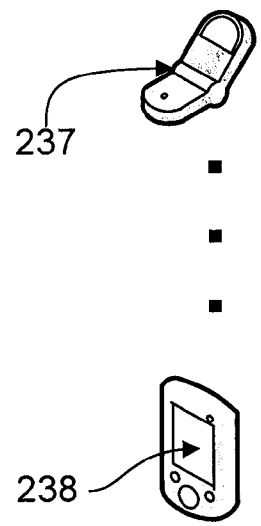

FIGS. 1 and 2 illustrate examples of a preferred embodiment of an electronic interface 100 and apparatus 200. As alluded to earlier, interface 100 is typically embedded as part of a WWW page on an Internet server 210, and is thus displayed within a user browser 235, which is linked through a network connection 220 to such server 210. The browser 235 may be executed as software on a client device 230, such as a desktop computer, a notebook computer, a PDA 238, a cell phone 237, and other portable devices. A computer readable medium 240 may be provided having instructions stored thereon, which when executed by a computer such as a server 210 or client device 230 cause execution of steps described herein. The details of such servers 210, client devices 230, browsers 235, and WWW page 215 codings are well known, and are not material to the present invention. Those skilled in the art will appreciate that any number of combinations of such elements will interoperate with the present invention.

As part of electronic interface 100, a number of viewable fields are presented to a user by a WWW page for visualizing stock information. These include, in this instance three primary areas:

a WWW page header 105 which identifies the service provider and related contact/help information;

a stock watch list 110, which identifies stocks being monitored by the user at this particular service provider;

a legend area 150, which identifies a color type used to indicate different types of information in stock watch list 110.

Other aspects of a WWW page commonly associated with the same are not shown in FIG. 1 so as to better emphasize the nature of the present invention. It will be understood, of course, that other items may be present and displayed within such page, including other URL tags, Java applets, etc.

WWW page header 105 can be implemented in any conventional fashion known in the art. Again, in some environments it may be desirable to limit the size of such headers as a mechanism for reducing visual space overhead within smaller displays (i.e., in a PDA type application).

Stock watch list 110 contains a number of rows 140, 141, 142, 143 and 144 (which identify particular stocks) and columns 115, 120, 125 and 130 (which provide unique information about a particular stock). As an example, in row 140, for the security identified as "Amazon.com," the stock watch list 110 provides the following trading information: (1) a visual indicator 151 (a colored traffic light in a preferred embodiment) identifying whether the trading information displayed is real-time, delayed, or end-of-day; (2) a stock trading symbol 120 (in this case AMZN); (3) a stock name 125 (Amazon.com); (4) and assorted trading information (last price, change, % change) in a set of columns 130.

It will be appreciated, of course, that this is merely exemplary trading data, and other information could be provided on an as-needed or as-desired basis. Furthermore, it will be understood by those skilled in the art that while stocks are used as an example, any form of tradable instrument (bond, options, commodities) ate also equally suitable for incorporation in an electronic interface of the present invention.

Legend area 150 identifies a plurality of traffic color indicators, each of which corresponds to a unique type of trading information. Thus, for example, a green traffic light is used to designate real-time trading data; a yellow traffic light is used to denote delayed trading data; and a red traffic light is used to identify end-of-day trading data. This particular set of colors and symbols was selected so as to correlate with common human experience and understandings of traffic symbols, and thus they naturally "suggest" the meaning of the information without requiring additional training or learning by the user.

Other symbols and colors are of course also useable and will be apparent to those skilled in the art. For example, a simple box with a prominent letter identifying "R" for real-time, "D" for delayed, and "C" for closing quote might be used. In another instance, a flashing (or blinking) indicator at a first frequency may be used to denote a real-time quote, while a second indicator at a second frequency, or even a static (constant intensity) indicator could be used denote a delayed quote. Different combinations of colors, letters, symbols, and other visual techniques will be apparent to skilled artisans from the present teachings. The only compelling criterion is that they of course be sufficiently distinctive from each other so that a person visualizing items within interface 100 can easily and quickly distinguish one type of item versus another. Again, in a preferred embodiment, the level of distinctiveness is selected to be in compliance with various exchange regulations (which will vary from exchange to exchange) and any SEC display requirements.

Thus, in the preferred embodiment of FIG. 1, a separate indicator column 115 contains a visual indicator for each stock—in this case, a colored traffic light. In the case of Amazon, for example, a visual indicator 151 would be green if a real-time subscription was available for that stock. Another stock, such as IBM in row 142 might not be available in real time from the NYSE, and so the indicator for that stock would be yellow. At the end of the day, the indicators for all stocks would change to red to designate that trading had ceased.

In other embodiments, additional colors could be used to designate other types of data, such as opening trades, after-hour trades, etc. In the latter case, an additional traffic light indicator, such as a flashing white traffic light, could denote active post-regular hours trading.

In another embodiment, it may be desirable to eliminate the separate indicator altogether to save space and provide a different look and feel appropriate for a different audience. For example, the visual indicator could be implemented by simply highlighting the stock symbol 120, the stock name 125, or the entire row entry with the appropriate color/intensity or visual characteristic. As an example, a background (or foreground) field 152 for Amazon.com row might be displayed in green to denote a real-time quote.

Other fields could be chosen instead for providing a visual indicator to a user, depending on the layout of stock watch list 110, the characteristics of the display, etc. For example, in small form factor devices, where color is not always available (i.e., a cell phone) it may be preferable to make a particular field flash or blink at a low frequency rate to designate delayed quotes, while real-time quotes could be indicated with a higher frequency rate of blinking/flashing, or in bolder font, etc.

In alternative embodiments, the display characteristics of an entire row, such as row 142 for the IBM stock entry—can be used to serve as a visual indicator as noted by indicator box 153.

Again, other examples will be apparent to skilled artisans as simple design choices based on the particular characteristics of the display being used. The methods, techniques and requirements for altering the visual characteristics of a particular field, row, or entry in a display are well-known to those skilled in the art, and will vary from device to device. Furthermore, to better illustrate the features of the present invention, other aspects of interface 100 have been omitted, and it will be understood that such interface could include other options, features, entries, etc., that ate not specifically shown.

In this manner, an interface 100 can simultaneously display different types of stock quotes while still clearly differentiating between the types of quotes (real-time, delayed, opening, closing, or after-hours) through the use of some form of visual indicator. This allows a service provider to give the benefit of various kinds of trading information to an end user and at the same time ensure compliance with various exchange regulations requiring clear identification of the type of data being provided. This is done, also, in a manner that requires very little additional display and/or visual overhead, thus making it more compatible with future generations of handheld products that utilize smaller and smaller displays.

In alternative embodiments, stock watch list 110 may itself be sortable in response to a user sort command into distinct groups of quote types, so that, for example, all real-time quotes could be moved to a top portion of the list, and all the delayed quotes to a bottom portion of the list. This differentiation, too, may assist a user in quickly identifying the nature of the quote being displayed in conjunction with the visual indicator. In some embodiments interface 100 may be capable of automatically sorting stock watch list 110 in such fashion to reduce user burden.

In yet other embodiments, legend area 150 might be moved to a separate WWW page, so that it does not necessarily appear on the same screen as the stock watch list 110. This could be done to reduce further the display space requirements.

Furthermore, in another variation of the invention, an Internet service provider may provide quotes within a stock watch list 110 through a first type of WWW page to a first type of browser (i.e., such as might be used on a desktop device). Such stock watch list 110 may identify the nature of the quotes explicitly through conventional prior art labels, such as with an additional column (in lieu of indicator column 115). Nonetheless, this same service provider may implement the present invention so as to re-package, in more compact form, such quotes for display to a second type of a browser (i.e., such as might be used on a cell phone, a PDA, and similar smaller capacity display devices) using the visual indicator of the present invention. This may be done in conjunction within a second type of web page that is particularly modified for smaller capacity displays such as a web page that is based on a wide area protocol (WAP) and similar standards.

The visual indicator of the present invention, therefore, quickly, easily and clearly identifies a time-based or time-related quality or characteristic of a data item. As such, it could be incorporated in other domains where it is useful to identify such information about an item. In stock trading applications, for example, it is often useful to know when examining one's trading activities whether a particular transaction has been completed or is pending, and a similar visual indicator could be used for such designations as well.

In addition, in other stock trading applications, it may be desirable to distinguish one type of quote from another through another characteristic than time. For example, the visual indicator may be used instead to designate a particular market maker (the origin of the quote), or whether the quote is a subject quote, a workout quote, or a firm quote, etc.

Finally, in some applications, it may be desirable to use a plurality of visual indicators to correspond as short descriptors for a plurality of characteristics. For instance, a traffic light might be used as a first visual indicator to denote the time-based characteristic (real-time, delayed, etc.) while a company logo might be used as a second visual indicator to identify a company security, or the origin of the quote, etc. Other examples will be apparent to those skilled in the art from the present teachings.

Furthermore, sporting event scores/outcomes/progress are often delayed, and these could be identified also within a graphical interface with distinct visual indicators as being "live" scores, "delayed" scores, or even "final" scores. Other examples will be apparent to those skilled in the art.

As a further example, in an online electronic auction application, instead of providing an additional field that indicates the time remaining in the auction, a small visual indicator of the type above could be used to designate the expiration of the auction as being within an hour, a day, a week, or some other useful unit of time. Upon moving an input device (such as mouse) over the visual indicator, additional information can be presented to the user identifying the actual time left (in counter form or other convenient form) in a particular auction.

Similarly, in an online message board system application, a different visual indicator could be used to designate whether a particular message author is online, off-line, or has recently been online. This can facilitate a users' interaction with such author through instant messaging, chat rooms, follow-up postings, etc.

Again, these are but examples, and other applications of the invention will be apparent to those skilled in the art.

The above descriptions are intended as merely illustrative embodiments of the proposed inventions. It is understood that the protection afforded the present invention also comprehends and extends to embodiments different from those above, but which fall within the scope of the present claims.

What is claimed is:

1. An apparatus comprising:
   a network connection configured to link the apparatus with a client device,
   wherein the apparatus is configured to generate a graphical user interface for display on a display of the client device, the graphical user interface enabling a user of the client device to visibly identify a time-based characteristic of an item being displayed, the graphical user interface comprising:
     a display area configured to identify a plurality of items being monitored by the user, wherein each of said items can include either a first time-based characteristic or a second time-based characteristic;
     said display area being configured so that first identification information for a first item appears in a first portion of said display area and second identification information for a second item appears in a second portion of said display area; and
     said display area further configured to include a first visual indicator associated with said first portion for visually indicating said first time-based characteristic, and a second visual indicator associated with said second portion of said display area for visually indicating said second time-based characteristic;
     wherein said first visual indicator and said second visual indicator are used to represent different time periods for which said first identification information and said second identification information are valid;
     wherein said second visual indicator is adapted to be sufficiently visually different from said first visual indicator so as to communicate to the user that said first item and said second item have different time-based characteristics.

2. The apparatus of claim 1, wherein said client device includes a cell-phone, a personal digital assistant (PDA), or other hand-held device configured with an Internet browser that is adapted for interacting with reduced capacity World Wide Web pages, including those compatible with a Wide Area Protocol (WAP).

3. The apparatus of claim 1, wherein said visual indicator is in a third portion of said display area separate from said first portion and said second portion.

4. The apparatus of claim 3, wherein said visual indicator includes a colored traffic light symbol.

5. The apparatus of claim 3, wherein said visual indicator includes a single symbol or set of symbols which act as a short hand descriptor for said first time-based characteristic and said second time-based characteristic.

6. The apparatus of claim 1, wherein said first visual indicator is incorporated as part of said first portion, and said second visual indicator is incorporated as part of said second portion.

7. The apparatus of claim 6, wherein said first visual indicator and said second visual indicator are generated by a color for a foreground field or a background field.

8. The apparatus of claim 1, wherein said first visual indicator and said second visual indicator are generated by a first flashing display area and a second flashing display area respectively, and such that different flash rates are used for said first visual indicator and said second visual indicator.

9. The apparatus of claim 1, wherein said time-based indicator is associated with one or more of the following: a trading instrument, an auction item, an online availability of an Internet user, and/or a sporting event item.

10. The apparatus of claim 1, wherein said interface automatically sorts itself so that any items having such first time characteristic are placed in a separate display region from items having said second time characteristic.

11. An apparatus comprising:
    a network connection configured to link the apparatus with a client device,
    wherein the apparatus is configured to generate a graphical user interface for display on a computer screen of the client device, the graphical user interface configured to provide a time-based characteristic of securities trading information, the graphical user interface comprising:
      a first display area configured to be displayed on the computer screen and containing a plurality of separate data fields associated with a tradable security, said separate data fields including:
        (a) at least one identification field for identifying a company and/or a trading symbol associated with said tradable security;
        (b) at least one trading information field for specifying one or more of a price, a trading volume, a price change, or a percentage change in said tradable security; and
        (c) a visual indicator for visually indicating a time-based characteristic of said tradable security, said visual indicator having at least two different appearances, including a first appearance representing a first time period for which said trading information is valid, and a second appearance representing a second time period for which said trading information is valid.

12. The apparatus of claim 11, wherein said interface is configured to satisfy a Securities and Exchange Commission display requirement for identifying whether trading information is real-time or delayed.

13. The apparatus of claim 11, wherein both real-time and delayed trading information for different tradable securities can be displayed at the same time.

14. The apparatus of claim 11, wherein said visual indicator includes at least one of a color, a symbol or a display frequency associated with a visual indicator field.

15. The apparatus of claim 11, wherein said visual indicator further specifies an origin of a quote associated with said tradable security, including a dealer or market maker.

16. The apparatus of claim 11, wherein said visual indicator further specifies a type of quote associated with said tradable security, including whether said quote is a firm quote, a subject quote, or a workout quote.

17. The system of claim 11 wherein the first time period is associated with the trading information being real-time.

18. An apparatus comprising:
a network connection configured to link the apparatus with a client device,
wherein the apparatus is configured to generate a graphical user interface for display on a display screen of the client device, the graphical user interface configured to provide a visual indicator representing a characteristic of securities trading information, the graphical user interface comprising:
a first display area configured to be displayed on the display screen and containing a plurality of separate data fields associated with a tradable security, said separate data fields including:
(a) at least one identification field for identifying at least one of the following: a company associated with said tradable security and a trading symbol associated with said tradable security;
(b) at least one trading information field for specifying one or more of a price, a trading volume, a price change, or a percentage change in said tradable security; and
(c) a visual indicator for visually indicating a characteristic of said tradable security, said visual indicator having at least two different appearances, including a first appearance representing a first characteristic of said trading information, and a second appearance representing a second characteristic of said trading information.

19. The apparatus of claim 18, wherein said visual indicator represents an origin of a quote associated with said tradable security.

20. The apparatus of claim 18, wherein said visual indicator specifies a type of quote associated with said tradable security.

21. A computer readable medium having instructions stored thereon, the instructions, when executed by a computer, provide for:
displaying at least one identification field identifying at least one of the following: a company associated with a tradable security and a trading symbol associated with the tradable security;
displaying trading information for the tradable security, including at least one of the following: a price, a trading volume, a price change, or a percentage change; and
displaying a visual indicator indicating a time-based characteristic of said tradable security, said visual indicator having at least two different appearances, including a first visible appearance representing a first time period for which said trading information is valid, and a second appearance representing a second time period for which said trading information is valid.

22. A computer readable medium having instructions stored thereon, the instructions, when executed by a computer, provide for:
displaying an identification field for a tradable security;
displaying trading information for the tradable security, the trading information including at least one of the following: a price, a trading volume, a price change, and a percentage change;
displaying a first visual indicator indicating a first class of information for the trading information, the first visual indicator corresponding with a time-based characteristic of the trading information;
determining a change in the class of trading information from the first class of information to a second class of information, wherein the change is determined based on a comparison of the time-based characteristic with a present time; and
changing the first visual indicator to a second visual indicator, the second visual indicator indicating the second class of information.

* * * * *

UNITED STATES PATENT AND TRADEMARK OFFICE
CERTIFICATE OF CORRECTION

PATENT NO. : 7,613,645 B2  Page 1 of 1
APPLICATION NO. : 10/271020
DATED : November 3, 2009
INVENTOR(S) : Knight It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-sixth Day of October, 2010

David J. Kappos
*Director of the United States Patent and Trademark Office*